(12) United States Patent
Hanashima et al.

(10) Patent No.: US 10,656,318 B2
(45) Date of Patent: May 19, 2020

(54) OPTICAL BODY AND LIGHT EMITTING DEVICE

(71) Applicant: DEXERIALS CORPORATION, Tokyo (JP)

(72) Inventors: Naoki Hanashima, Tokyo (JP); Koji Sasaki, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 16/145,937

(22) Filed: Sep. 28, 2018

(65) Prior Publication Data

US 2019/0101684 A1    Apr. 4, 2019

(30) Foreign Application Priority Data

Sep. 29, 2017   (JP) ................ 2017-191540

(51) Int. Cl.
*G02B 6/00* (2006.01)
*F21V 8/00* (2006.01)
*G02B 3/00* (2006.01)
*G09F 13/18* (2006.01)

(52) U.S. Cl.
CPC ......... *G02B 6/0025* (2013.01); *G02B 3/0056* (2013.01); *G02B 6/0036* (2013.01); *G09F 13/18* (2013.01); *G09F 2013/1854* (2013.01); *G09F 2013/1863* (2013.01)

(58) Field of Classification Search
CPC .. G02B 6/0025; G02B 3/0056; G02B 6/0036; G02B 6/0035; G09F 13/18; G09F 2013/1854; G09F 2013/1863; G09F 2013/184; G09F 2013/1886; G02F 2013/185
See application file for complete search history.

(56) References Cited

U.S. PATENT DOCUMENTS

| 6,046,855 A | 4/2000 | Goto |
| 6,174,064 B1 | 1/2001 | Kalantar et al. |
| 2008/0266874 A1 | 10/2008 | Chang |
| 2009/0180296 A1* | 7/2009 | Chen et al. ............. G09F 13/18 362/604 |
| 2010/0142183 A1* | 6/2010 | Lerenius ............. G02B 6/0003 362/85 |

(Continued)

FOREIGN PATENT DOCUMENTS

| JP | 2004-145328 A | 5/2004 |
| JP | 2012-136199 A | 7/2012 |

OTHER PUBLICATIONS

Feb. 18, 2019, European Search Report issued for related EP Application No. 18197903.0.

*Primary Examiner* — Y M. Quach Lee
(74) *Attorney, Agent, or Firm* — Paratus Law Group, PLLC

(57) ABSTRACT

There is provided an optical body including: a base material; and a light extraction unit that is formed on a surface of the base material and that extracts, to an outside of the base material, internally propagating light that is injected in an inside of the base material from a side surface of the base material. The light extraction unit is formed of a convex microlens array, and a maximum inclination angle of the convex microlens array substantially coincides with a maximum propagation angle of the internally propagating light.

4 Claims, 9 Drawing Sheets

(56) References Cited

U.S. PATENT DOCUMENTS

| | | | |
|---|---|---|---|
| 2011/0157912 A1* | 6/2011 | Wu | G02B 6/0043 362/606 |
| 2012/0235891 A1 | 9/2012 | Nishitani et al. | |
| 2013/0215639 A1* | 8/2013 | Lin et al. | G02B 6/0011 362/603 |
| 2016/0209577 A1 | 7/2016 | Ford et al. | |

* cited by examiner

OPTICAL BODY AND LIGHT EMITTING DEVICE

CROSS REFERENCE TO RELATED APPLICATION(S)

This application is based upon and claims benefit of priority from Japanese Patent Application No. 2017-191540, filed on Sep. 29, 2017, the entire contents of which are incorporated herein by reference.

BACKGROUND

The present invention relates to an optical body and a light emitting device.

As a kind of optical body, there is known an optical body in which a light waveguiding phenomenon and a light diffusion phenomenon are combined, for example as disclosed in JP 2012-136199A. Such an optical body is also called a light guide plate. A light extraction unit that diffuses light is formed on a surface of the light guide plate. Light is injected into the inside of the light guide plate from a light source that is provided on a side surface of the light guide plate. The light injected in the inside of the light guide plate, that is, internally propagating light propagates through the inside of the light guide plate while reflecting at surfaces of the light guide plate (that is, interfaces between the inside and the outside of the light guide plate). After that, the internally propagating light is reflected at the light extraction unit, and is emitted from a surface on the opposite side to the surface on which the light extraction unit is formed. That is, the light guide plate emits light injected from a side surface of the light guide plate, from a surface of the light guide plate. Thus, the region where the light extraction unit is formed serves as a light emitting region.

The light guide plate is used as, for example, light emitting bodies for various display devices or light emitting bodies for illumination. Examples of the display device in which a light guide plate is used include various LCDs (for example, an LCD of a local dimming driving system), passive-type display devices, light ornamentation panels for amusement, illumination panels for advertisements such as digital signage, etc. In these display devices, an expression looking as if light stood out from a region where a pattern of the light extraction unit is formed, that is, a light emitting region is enabled by the turning on and off of the light source. Various designs (numerals of speedometers, etc.) are created by the shape of the light emitting region.

SUMMARY

However, conventional light guide plates have had the problem that the light extraction efficiency (radiation efficiency) is not sufficient. On the other hand, JP 2004-145328A discloses a microlens array. The present inventors attempted to use the microlens array disclosed in JP 2004-145328A for a light extraction unit of a light guide plate, but the light extraction efficiency was not sufficiently improved.

Thus, the present invention has been made in view of the problem mentioned above, and an object of the present invention is to provide a new and improved optical body capable of enhancing the light extraction efficiency.

To solve the above-described problem, according to an aspect of the present invention, there is provided an optical body including: a base material; and a light extraction unit that is formed on a surface of the base material and that extracts, to an outside of the base material, internally propagating light that is injected in an inside of the base material from a side surface of the base material. The light extraction unit is formed of a convex microlens array, and a maximum inclination angle of the convex microlens array substantially coincides with a maximum propagation angle of the internally propagating light.

Here, a rate of filling of the convex microlens array may be 100%.

In addition, a boundary line between convex microlenses constituting the convex microlens array may form a straight line and further a polygon in a planar view.

According to another aspect of the present embodiment, there is provided a light emitting device including: the above optical body; and a light source that is provided on a side surface of the optical body and injects light into an inside of the optical body from the side surface of the optical body.

As described above, according to the present invention, the maximum inclination angle of the convex microlens array substantially coincides with the maximum propagation angle of internally propagating light, and therefore the light extraction efficiency can be enhanced.

DETAILED DESCRIPTION OF THE EMBODIMENT(S)

Figure 1:
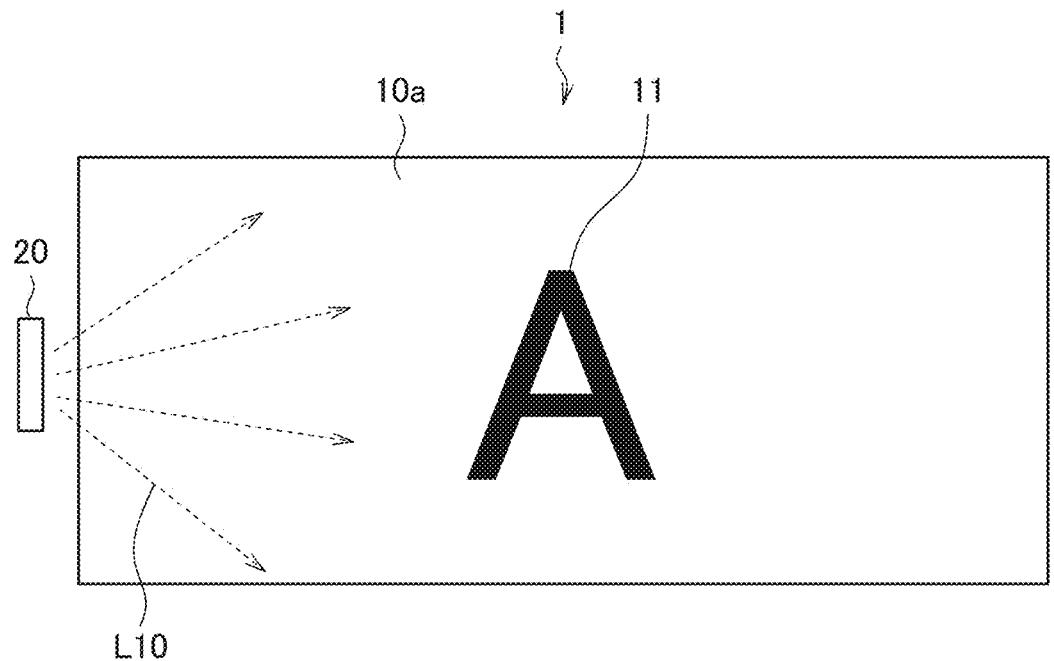
FIG. 1 is a plan view showing a rough configuration of an optical body according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

<1. Configuration of Optical Body>

Next, the configuration of an optical body 1 according to the present embodiment is described on the basis of FIG. 1 to FIG. 4. The optical body 1 includes a base material 10 and a light extraction unit 11. The optical body 1 is also called a light guide plate.

Figure 2:
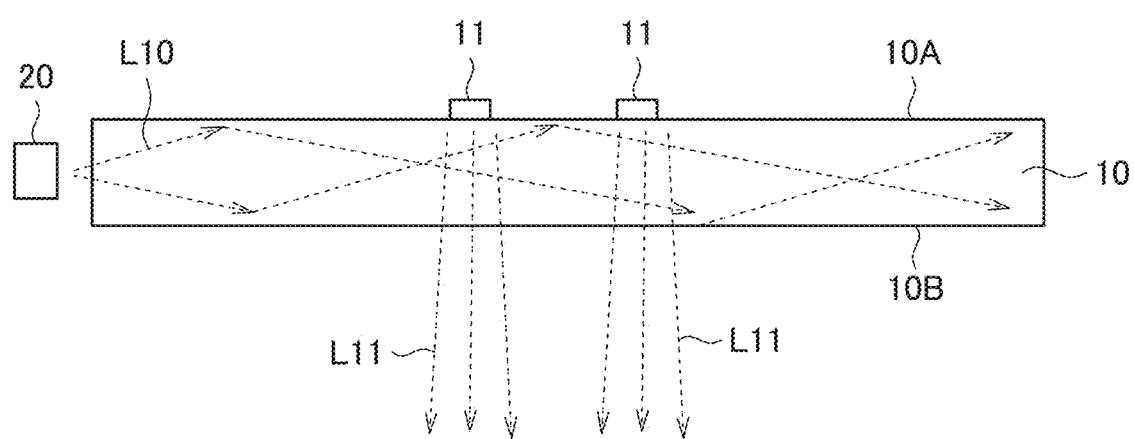
FIG. 2 is a side cross-sectional view showing a cross-sectional structure of the optical body according to the embodiment.

The base material 10 propagates light injected in the inside of the base material 10, that is, internally propagating light in planar directions of the base material 10 (i.e., directions perpendicular to the thickness direction; in FIG. 2, horizontal directions). That is, the internally propagating light propagates through the inside of the base material 10 while repeating total reflection at surfaces 10A and 10B of the base material 10. Hence, the base material 10 is formed of a resin excellent in light conductivity, preferably a thermoplastic resin. Examples of such a resin include polymethyl methacrylate, a polycarbonate, A-PET, a cycloolefin copolymer, a cycloolefin polymer, and the like. The base material 10 may also be formed of an inorganic material excellent in light conductivity. Examples of such an inorganic material include silicon-based materials, more specifically glass or the like. The thickness of the base material 10 is not particularly limited, and may be adjusted in accordance with the use etc. of the optical body 1, as appropriate.

Figure 3:
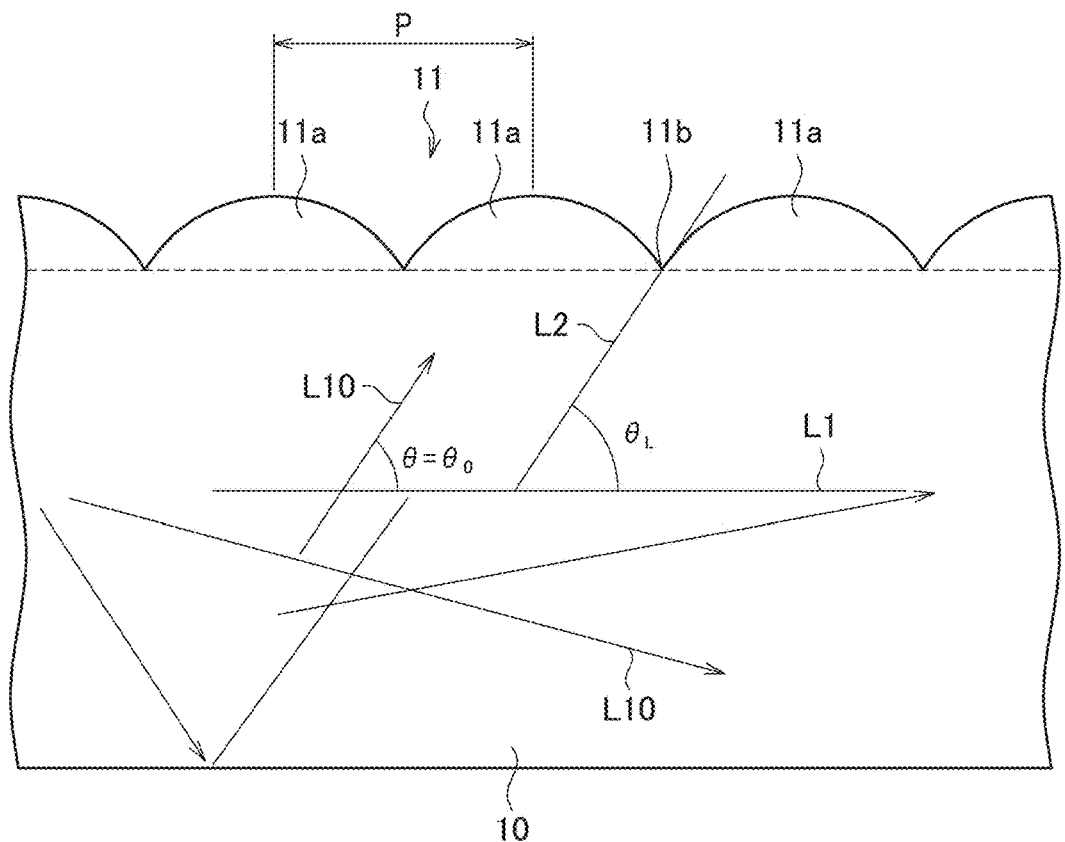
FIG. 3 is an enlarged side cross-sectional view of a part of FIG. 2.

The light extraction unit 11 is formed on at least one surface 10A of the base material 10. As shown in FIG. 2 and FIG. 3, the light extraction unit 11 extracts internally propagating light, and emits the internally propagating light to the outside of the optical body 1. Straight line L10 of FIG. 3 shows the optical path of internally propagating light, and straight line L11 shows the optical path of light extracted to the outside, that is, extracted light. That is, internally propagating light that has arrived at the light extraction unit 11 is reflected (diffused) at a surface of the light extraction unit 11, and is emitted to the outside from surface 10B due to a light diffraction phenomenon. The light extraction unit 11 is formed in a place of surface 10A from which it is intended to extract light. An expression looking as if light stood out from a region where a pattern of the light extraction unit 11 is formed, that is, a light emitting region is enabled by the turning on and off of a light source 20. Various designs are created by the shape of the light emitting region. In the example shown in FIG. 1, a design of "A" of the alphabet is created. As a matter of course, the design formed by the light emitting region is not limited to this example. For example, frames, graduation marks, numerals, etc. of speedometers may be created.

Figure 4:
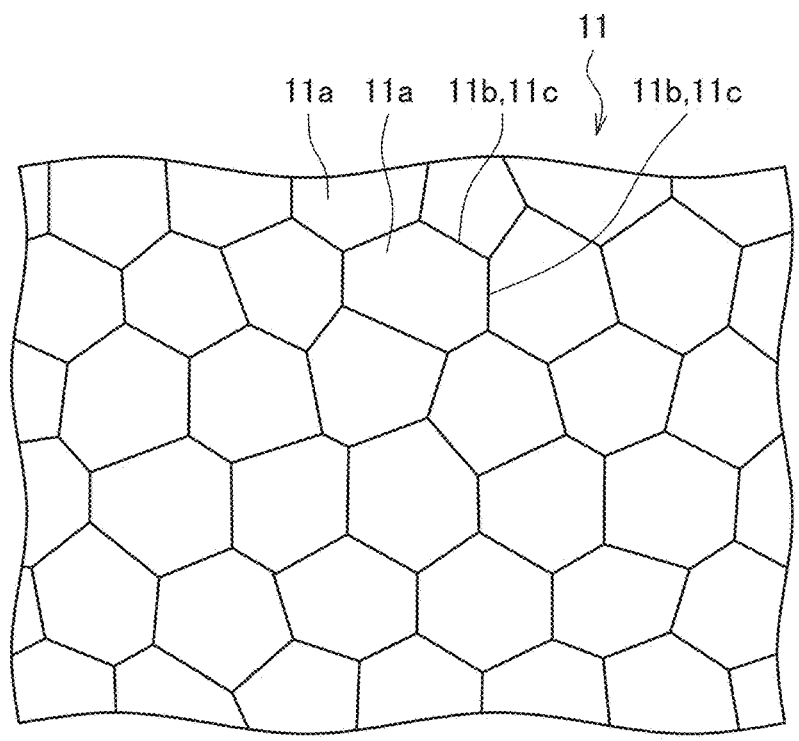
FIG. 4 is an enlarged plan view of a part of FIG. 1.

Here, the configuration of the light extraction unit 11 is described in detail on the basis of FIG. 2 to FIG. 4. The light extraction unit 11 is formed of a convex microlens array. That is, the light extraction unit 11 includes a large number of convex microlenses 11a.

Internally propagating light is reflected (totally reflected) at a surface of the convex microlens 11a, and is emitted to the outside of the optical body 1 from surface 10B. Here, not all the internally propagating light reflected at the surface of the convex microlens 11a is emitted to the outside. That is, internally propagating light reflected at an end 11b of the convex microlens 11a or the vicinity of it is emitted to the outside. On the other hand, most of the internally propagating light reflected at the other portions of the convex microlens 11a is reflected at surface 10B again, and travels through the inside of the base material 10. Thus, the region of the end 11b of the convex microlens 11a and the vicinity of it functions as the light extraction unit 11. Here, in the case where the ends 11b of adjacent convex microlenses 11a overlap, the end 11b forms a boundary line 11c between the convex microlenses 11a. In the case where adjacent convex microlenses 11a are apart, the end 11b forms a boundary line between the convex microlens 11a and the base material 10.

As shown in FIG. 3, as the maximum inclination angle $\theta_L$ of the convex microlens 11a becomes larger, the change in the propagation angle of internally propagating light becomes larger when the internally propagating light is reflected at the surface of the convex microlens 11a. Hence, the light extraction efficiency (radiation efficiency) is increased. Here, the maximum inclination angle $\theta_L$ of the convex microlens 11a is the angle between a tangent line L2 at the end 11b of the convex microlens 11a and straight line L1 (a straight line showing a planar direction of the base material 10), and is represented by Mathematical Formula (1) below. The propagation angle of internally propagating light is the angle θ between the optical path of the internally propagating light (straight line L10) and straight line L1. In FIG. 3, the propagation angle θ coincides with the maximum propagation angle $\theta_0$ described later. The light extraction efficiency is conceptually the ratio between the total light intensity of light injected in the optical body 1 from the light source 20 and the total light intensity of light emitted from the light extraction unit 11.

On the other hand, if the maximum inclination angle $\theta_L$ of the convex microlens 11a is too large, the reflection of internally propagating light at the surface of the convex microlens 11a does not satisfy the requirements of total reflection; hence, part of the internally propagating light that has arrived at the convex microlens 11a is likely to leak out from the surface of the convex microlens 11a to the outside of the optical body 1. Consequently, the light extraction efficiency is rather reduced.

Therefore, it can be said that the case where the light extraction efficiency is at the maximum is a case where the maximum inclination angle $\theta_L$ of the convex microlens 11a substantially coincides with the maximum propagation angle $\theta_0$ of internally propagating light. Here, the maximum propagation angle $\theta_0$ of internally propagating light is what is called the critical angle, and is represented by Mathematical Formula (2) below.

[Math. 1]

$$\theta_L = \sin^{-1}\left[\frac{p}{2R}\right] \quad (1)$$

[Math. 2]

$$\theta_0 = 90 - \sin^{-1}\left[\frac{1}{n}\right] \quad (2)$$

In Mathematical Formula (1), p represents the pitch (μm) of the convex microlens 11a (the distance between apices), and R represents the radius of curvature (μm) of the convex microlens 11a. In Mathematical Formula (2), n represents the refractive index of the convex microlens 11a. In Mathematical Formulae (1) and (2), the value of $\sin^{-1}$ is converted to the unit of degree. In Mathematical Formula (2), it is assumed that the optical body 1 is used in air. In the case where the optical body 1 is used in an ambient environment other than air, "1" of the numerator is replaced with a refractive index in accordance with the usage environment. In FIG. 3, the maximum inclination angle $\theta_L$ of the convex microlens 11a substantially coincides with the maximum propagation angle $\theta_0$ of internally propagating light.

Here, the light extraction unit 11 includes a plurality of convex microlenses 11a. For reasons of manufacturing errors etc., the shapes of the convex microlenses 11a are not completely the same. Also a case where the shape of the convex microlens 11a is varied intentionally is envisaged. Therefore, the maximum inclination angle $\theta_L$ of the convex microlens 11a may vary between convex microlenses 11a. Thus, in the present embodiment, the arithmetic average value of the maximum inclination angles $\theta_L$ calculated for the plurality of convex microlenses 11a is caused to substantially coincide with the maximum propagation angle $\theta_0$. Hereinafter, the arithmetic average value of the maximum inclination angles $\theta_L$ may be referred to as "the maximum inclination angle $\theta_{Ln}$ of the convex microlens array."

Thus, in the present embodiment, the maximum inclination angle $\theta_{Ln}$ of the convex microlens array substantially coincides with the maximum propagation angle $\theta_0$. When calculating the maximum inclination angle $\theta_{Ln}$ of the convex microlens array, some (for example, several tens of) convex microlenses 11a may be picked out, and the arithmetic average value of the maximum inclination angles $\theta_L$ of these may be calculated.

"Substantially coincide" is a concept that may include not only complete coincidence but also some errors. For example, when the error between the maximum inclination angle $\theta_{Ln}$ of the convex microlens array and the maximum propagation angle $\theta_0$ is less than or equal to ±10 degrees, both may be regarded as substantially coinciding. In order for the maximum inclination angle $\theta_{Ln}$ of the convex microlens array and the maximum propagation angle $\theta_0$ to substantially coincide, the error between these is preferably less than or equal to ±7 degrees, more preferably less than or equal to ±5 degrees, and still more preferably less than or equal to ±3 degrees.

In the present embodiment, since the maximum inclination angle $\theta_{Ln}$ of the convex microlens array substantially coincides with the maximum propagation angle $\theta_0$, the light extraction efficiency can be enhanced. Furthermore, also transmission haze is improved by such a configuration. That is, at the time of turning-off of the light source 20, the light extraction unit 11 is less likely to be seen by the observer.

The microlenses constituting the light extraction unit 11 are "convex" microlenses 11a. In the case where the light extraction unit 11 is composed of concave microlenses, the effect of the present embodiment is not obtained, as described in Comparative Examples described later. The present inventors consider that the following reason is a reason for this. Regardless of whether the microlens is convex or concave, the inclination angle of both ends of the microlens is the maximum inclination angle. In the case where the light extraction unit 11 is composed of convex microlenses 11a, a large number of both ends of convex microlenses 11a exist on the inside in the thickness direction of the optical body 1. That is, both ends of the convex microlens 11a are placed on the inside in the thickness direction of the optical body 1 with respect to the other regions of the convex microlens 11a. On the other hand, in the case where the light extraction unit 11 is composed of concave microlenses, a large number of both ends of concave microlenses exist on the surface side of the optical body 1. That is, both ends of the concave microlens protrude on the outside in the thickness direction of the optical body 1. Therefore, in the case where the light extraction unit 11 is composed of convex microlenses 11a, a larger amount of internally propagating light arrives at both ends of convex microlenses 11a, and changes the propagation angle largely. Thus, the light extraction efficiency is increased.

As shown in FIG. 4, the rate of filling of the convex microlens array is 100%. Here, the rate of filling is the ratio of the area of convex microlenses 11a in the total area of the convex microlens array. The rate of filling being 100% means that the total area of the convex microlens array is occupied by convex microlenses 11a. That is, the end 11b of any of all the convex microlenses 11a constituting the convex microlens array overlaps with the end 11b of an adjacent convex microlens 11a. Thereby, the light extraction efficiency is further enhanced. Furthermore, a fine quality image with little feeling of granularity can be displayed. As a matter of course, the rate of filling of the convex microlens array may be less than 100%; however, in view of the light extraction efficiency and a feeling of granularity, the rate of filling is preferably a value as close as possible to 100%. For example, the rate of filling is preferably more than or equal to 70%.

As shown in the drawing, the boundary line 11c between convex microlenses 11a forms a straight line and further a polygonal shape in a planar view. Thereby, the light extraction efficiency is further enhanced. Since the convex microlenses 11a are figures similar to each other (a spherical shape) and the rate of filling is 100%, the boundary line 11c forms the shape described above.

There are no particular limitations on the pitch of the convex microlens 11a; for example, it may be approximately 60 to 200 μm from the viewpoints of the ease of working, etc.

As described above, the region of the end 11b of the convex microlens 11a and the vicinity of it functions as the light extraction unit 11. Thus, it is sufficient for the convex microlens 11a to have a microlens function (that is, the function of totally reflecting internally propagating light) in the region of the end 11b and the vicinity of it.

The light extraction unit 11 can be observed with a scanning electron microscope (SEM), a cross-sectional transmission electron microscope (cross-sectional TEM), or the like, for example.

Here, the light extraction unit 11 is molded integrally with the base material 10, for example. Although details are described later, the light extraction unit 11 can be formed on a surface of the base material 10 by, for example, forming the base material 10 out of a thermoplastic resin and transferring, to the base material 10, the surface shape of a master 100 (the surface shape of the master 100 has the inverse shape of the light extraction unit 11).

On the other hand, the light extraction unit 11 may be formed as a separate body from the base material 10. In this case, the light extraction unit 11 is formed of a cured product of a curing resin, for example. Although details are described later, the light extraction unit 11 is formed by transferring the surface shape of the master 100 to an uncured resin layer that is formed on a surface of the base material 10 in advance, and then curing the uncured resin layer. Since the light extraction unit 11 can thus be formed on one surface of the base material 10 by using one master 100, the optical body 1 can be produced easily.

The cured product of a curing resin preferably has transparency. The curing resin contains a polymerizable compound and a curing initiator. The polymerizable compound is a resin that is cured by the curing initiator. Examples of the polymerizable compound include an epoxy polymerizable compound, an acrylic polymerizable compound, and the like. The epoxy polymerizable compound is a monomer, an oligomer, or a prepolymer containing one or two or more epoxy groups in a molecule. As the epoxy polymerizable compound, various bisphenol-type epoxy resins (a bisphenol A-type, a bisphenol F-type, etc.), a novolac-type epoxy resin, various modified epoxy resins of rubber, a urethane, and the like, a naphthalene-type epoxy resin, a biphenyl-type epoxy resin, a phenol novolac-type epoxy resin, a stilbenetype epoxy resin, a triphenolmethane-type epoxy resin, a dicyclopentadiene-type epoxy resin, and a triphenylmethane-type epoxy resin, prepolymers of these, and the like are given.

The acrylic polymerizable compound is a monomer, an oligomer, or a prepolymer containing one or two or more acryl groups in a molecule. Here, the monomer is further classified into a monofunctional monomer containing one acryl group in a molecule, a bifunctional monomer containing two acryl groups in a molecule, and a polyfunctional monomer containing three or more acryl groups in a molecule.

Examples of the "monofunctional monomer" include carboxylic acids (acrylic acid), hydroxy compounds (2-hydroxyethyl acrylate, 2-hydroxypropyl acrylate, and 4-hydroxybutyl acrylate), and alkyl or alicyclic monomers (isobutyl acrylate, t-butyl acrylate, isooctyl acrylate, lauryl acrylate, stearyl acrylate, isobornyl acrylate, and cyclohexyl acrylate), other functional monomers (2-methoxyethyl acrylate, methoxyethylene glycol acrylate, 2-ethoxyethyl acrylate, tetrahydrofurfuryl acrylate, benzyl acrylate, Ethyl Carbitol Acrylate, phenoxyethyl acrylate, N,N-dimethylaminoethyl acrylate, N,N-dimethylaminopropylacrylamide, N,N-dimethylacrylamide, acryloylmorpholine, N-isopropylacrylamide, N,N-diethylacrylamide, 2-(perfluorooctyl)ethyl acrylate, 3-perfluorohexyl-2-hydroxypropyl acrylate, 3-perfluorooctyl-2-hydroxypropyl acrylate, 2-(perfluorodecyl)ethyl acrylate, 2-(perfluoro-3-methylbutyl)ethyl acrylate, 2,4,6-tribromophenol acrylate, 2,4,6-tribromophenol methacrylate, 2-(2,4,6-tribromophenoxy)ethyl acrylate, and 2-ethylhexyl acrylate), and the like.

Examples of the "bifunctional monomer" include tri(propylene glycol) diacrylate, trimethylolpropane diallyl ether, a urethane diacrylate, and the like.

Examples of the "polyfunctional monomer" include trimethylolpropane triacrylate, dipentaerythritol pentaacrylate and dipentaerythritol hexaacrylate, di(trimethylolpropane) tetraacrylate, and the like.

Examples other than the acrylic polymerizable compounds enumerated above include acrylic morpholine, glycerol acrylate, a polyether-based acrylate, N-vinylformamide, N-vinylcaprolactam, ethoxydiethylene glycol acrylate, methoxytriethylene glycol acrylate, polyethylene glycol acrylate, EO-modified trimethylolpropane triacrylate, EO-modified bisphenol A diacrylate, an aliphatic urethane oligomer, a polyester oligomer, and the like. From the viewpoint of the transparency of the optical body 1, the polymerizable compound is preferably an acrylic polymerizable compound.

The curing initiator is a material that cures the curing resin. Examples of the curing initiator include a thermosetting initiator, a light-curing initiator, and the like. The curing initiator may also be one that makes curing with some kind of energy ray (for example, an electron beam) or the like other than heat or light. In the case where the curing initiator is a thermosetting initiator, the curing resin is a thermosetting resin; in the case where the curing initiator is a light-curing initiator, the curing resin is a light-curing resin.

Here, from the viewpoint of the transparency of the optical body 1, the curing initiator is preferably an ultraviolet curing initiator. Accordingly, the curing resin is preferably an ultraviolet curing acrylic resin. The ultraviolet curing initiator is a kind of light-curing initiator. Examples of the ultraviolet curing initiator include 2,2-dimethoxy-1, 2-diphenylethane-1-one, 1-hydroxycyclohexyl phenyl ketone, 2-hydroxy-2-methyl-1-phenylpropane-1-one, and the like.

The light extraction unit 11 may be formed of a resin provided with functionality such as hydrophilicity, water repellency, demisting, etc.

An additive in accordance with the use of the optical body 1 may be added to the light extraction unit 11. Examples of such an additive include an inorganic filler, an organic filler, a leveling agent, a surface conditioner, an antifoaming agent, etc. Examples of the type of the inorganic filler include fine particles of metal oxides such as $SiO_2$, $TiO_2$, $ZrO_2$, $SnO_2$, and $Al_2O_3$.

Although the light extraction unit 11 may be formed directly on the base material 10, a resin film (for example, a thermoplastic resin film) on which the light extraction unit 11 is formed may be adhered to the base material 10.

It is preferable that an antireflection structure be formed in regions of both surfaces of the base material 10 where the light extraction unit 11 is not formed. Examples of the antireflection structure include a micro concave-convex structure in which the average period of concavity and convexity is less than the smallest value of the wavelengths of visible light (what is called a moth-eye structure), a structure in which a high refractive index film and a low refractive index film are alternately stacked (an AR multiple-layer film), etc. By forming such an antireflection structure in regions where the light extraction unit 11 is not formed, the leakage of internally propagating light can be suppressed, and the reflection of extraneous light on the base material 10 can be suppressed. Therefore, the visibility of the light emitting region is improved. The method for manufacturing an antireflection structure is not particularly limited, and the antireflection structure may be formed on the surface of the base material 10 by a method similar to conventional manufacturing methods. For example, the micro concave-convex structure can be formed on the surface of the base material 10 by a method similar to a method for manufacturing the light extraction unit 11.

<2. Configuration of Light Emitting Device>

Next, the configuration of a light emitting device is described on the basis of FIG. 1 and FIG. 2. The light emitting device includes the optical body 1 described above and the light source 20. The type of the light source 20 is not particularly questioned, and may be a light source used for conventional light guide plates. That is, the light source 20 may be one that emits white light or one that emits monochromatic light. The operation of the light emitting device is roughly as follows. First, light is incident on the optical body 1 from the light source 20. The light injected in the inside of the optical body 1, that is, internally propagating light propagates through the inside of the optical body 1 while reflecting at both surfaces of the optical body 1 (that is, interfaces between the inside and the outside of the optical body 1).

Part of the internally propagating light arrives at the light extraction unit 11. The internally propagating light that has arrived at the light extraction unit 11 is totally reflected at a surface of the light extraction unit 11, that is, a surface of the convex microlens 11a, and is emitted to the outside of the optical body 1 from surface 10B. The observer visually identifies the light emitting device from the surface 10B side. In the present embodiment, since the maximum inclination angle $\theta_{Ln}$ of the convex microlens array substantially coincides with the maximum propagation angle $\theta_0$, the light extraction efficiency is enhanced.

<3. Configuration of Master>

Figure 7:
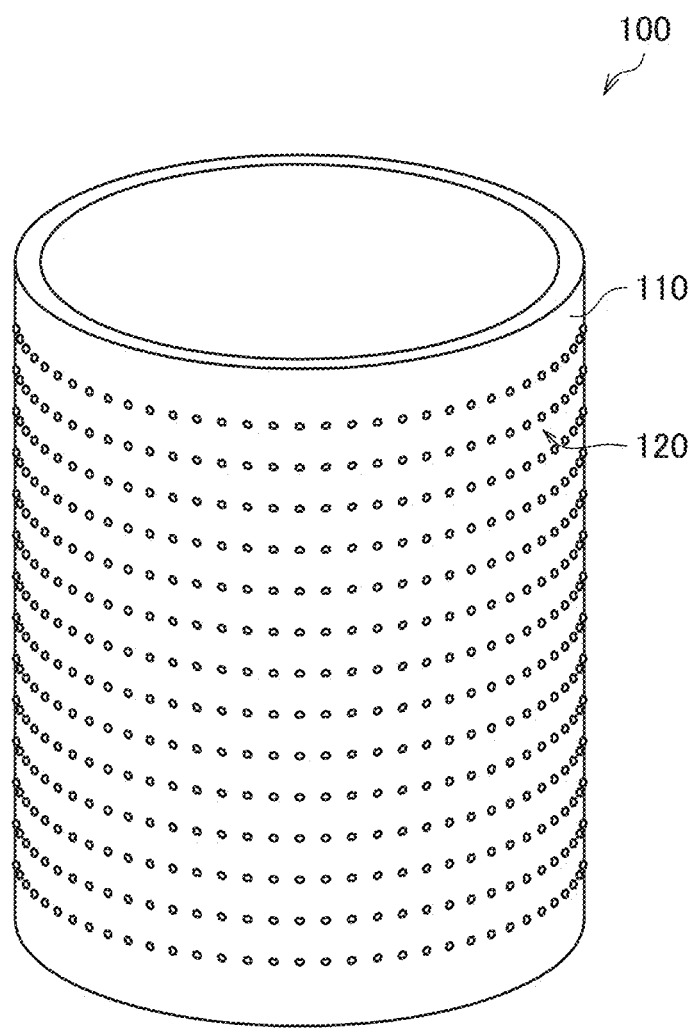
FIG. 7 is a perspective diagram illustrating an exemplary appearance of a master according to the present embodiment.

The light extraction unit 11 is produced using, for example, a master 100 shown in FIG. 7. Thus, next, the configuration of the master 100 is described. The master 100 is a master used in the nanoimprinting method, and has a round cylindrical shape, for example. The master 100 may have a round columnar shape or other shapes (for example, a flat plate-like shape). In the case where the master 100 has a round columnar or round cylindrical shape, a concave-convex structure (that is, a master concave-convex structure) 120 of the master 100 can be transferred seamlessly to a resin base material or the like by a roll-to-roll system. Thereby, the optical body 1 to which the master concave-convex structure 120 of the master 100 has been transferred can be produced with high production efficiency. From such a point of view, the shape of the master 100 is preferably a round cylindrical shape or a round columnar shape.

The master 100 is provided with a master base material 110, and the master concave-convex structure 120 formed on the circumferential surface of the master base material 110. The master base material 110 is a glass body, for example, and specifically is formed from quartz glass. However, the master base material 110 is not particularly limited insofar as the $SiO_2$ purity is high, and may also be formed from a material such as fused quartz glass or synthetic quartz glass. The master base material 110 may also be a laminate of the above materials on a metal matrix, or a metal matrix. The shape of the master base material 110 is a hollow round cylindrical shape, but may also be a round columnar shape, or some other shape. However, as described above, the master base material 110 preferably has a hollow round cylindrical shape or a round columnar shape. The master concave-convex structure 120 has the inverse shape of the surface shape of the optical body 1 (for example, the inverse shape of the light extraction unit 11 to be formed on one surface 10A of the base material 10).

<4. Method for Manufacturing Master>

Next, a method of manufacturing master 100 will be described. First, a base material resist layer is formed (deposited) on the master base material 110. At this point, the resist constituting the base material resist layer is not particularly limited, and may be either an organic resist or an inorganic resist. Examples of organic resists include novolac-type resist and chemically-amplified resist. Also, examples of inorganic resists include metallic oxides including one or multiple types of transition metals such as tungsten (W) or molybdenum (Mo). However, in order to conduct thermal reaction lithography, the base material resist layer preferably is formed with a thermo-reactive resist including a metallic oxide.

In the case of using an organic resist, the base material resist layer may be formed on the master base material 110 by using a process such as spin coating, slit coating, dip coating, spray coating, or screen printing. Also, in the case of using an inorganic resist for the base material resist layer, the base material resist layer may be formed by sputtering.

Next, by exposing part of the base material resist layer with an exposure device 200 (see FIG. 8), a latent image is formed on the base material resist layer. Specifically, the exposure device 200 modulates laser light 200A, and irradiates the base material resist layer with the laser light 200A. Consequently, part of the base material resist layer irradiated by the laser light 200A denatures, and thus a latent image corresponding to the master concave-convex structure 120 may be formed in the base material resist layer.

Next, by dripping a developing solution onto the base material resist layer in which is formed the latent image, the base material resist layer is developed. As a result, a concave-convex structure is formed in the base material resist layer. Subsequently, by etching the master base material 110 and the base material resist layer using the base material resist layer as a mask, the master concave-convex structure 120 is formed on the master base material 110. Note that although the etching method is not particularly limited, dry etching that is vertically anisotropic is preferable. For example, reactive ion etching (RIE) is preferable. By the above steps, the master 100 is produced. Note that anodic porous alumina obtained by the anodic oxidation of aluminum may also be used as the master. Anodic porous alumina is disclosed in WO 2006/059686, for example. Additionally, the master 100 may also be produced by a stepper using a reticle mask with an asymmetric shape.

<6. Configuration of Exposure Device>

Figure 8:
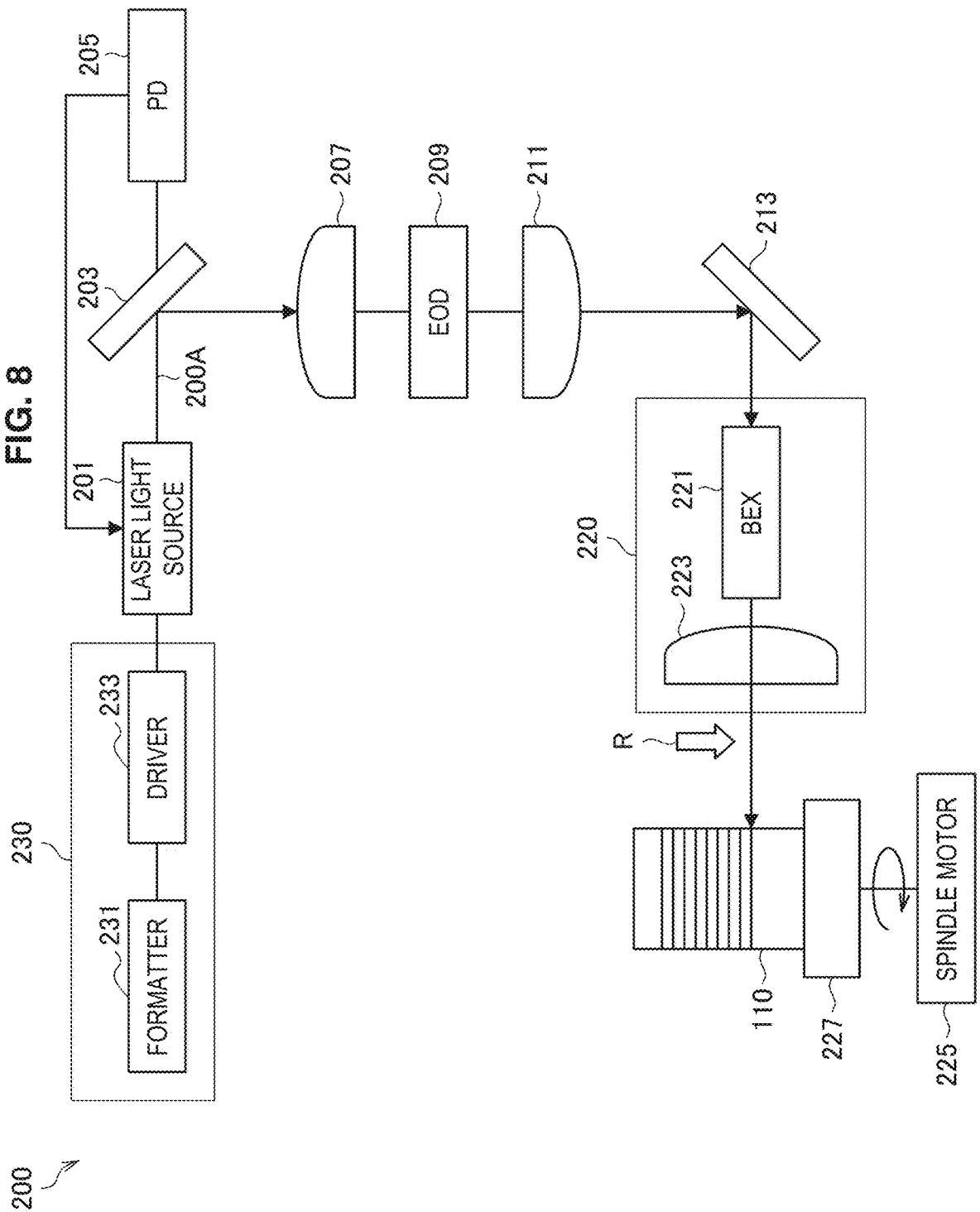
FIG. 8 is a block diagram illustrating an exemplary configuration of an exposure device.

Next, the configuration of the exposure device 200 will be described on the basis of FIG. 8. The exposure device 200 is a device that exposes the base material resist layer. The exposure device 200 is provided with a laser light source 201, a first mirror 203, a photodiode (PD) 205, a deflecting optical system, a control mechanism 230, a second mirror 213, a movable optical table 220, a spindle motor 225, and a turntable 227. Also, the master base material 110 is placed on the turntable 227 and able to be rotated.

The laser light source 201 is a light source that emits laser light 200A, and is a device such as a solid-state laser or a semiconductor laser, for example. The wavelength of the laser light 200A emitted by the laser light source 201 is not particularly limited, but may be a wavelength in the blue light band from 400 nm to 500 nm, for example. Also, it is sufficient for the spot diameter of the laser light 200A (the diameter of the spot radiated onto the resist layer) to be smaller than the diameter of the open face of a concavity of the master concave-convex structure 120, such as approximately 200 nm, for example. The laser light 200A emitted from the laser light source 201 is controlled by the control mechanism 230.

The laser light 200A emitted from the laser light source 201 advances directly in a collimated beam, reflects off the first mirror 203, and is guided to the deflecting optical system.

The first mirror 203 is made up of a polarizing beam splitter, and has a function of reflecting one polarized component, and transmitting the other polarized component. The polarized component transmitted through the first mirror 203 is sensed by the photodiode 205 and photoelectrically converted. Also, the photodetection signal photoelectrically converted by the photodiode 205 is input into the laser light source 201, and the laser light source 201 conducts phase modulation of the laser light 200A on the basis of the input photodetection signal.

In addition, the deflecting optical system is provided with a condenser lens 207, an electro-optic deflector (EOD) 209, and a collimator lens 211.

In the deflecting optical system, the laser light 200A is condensed onto the electro-optic deflector 209 by the condenser lens 207. The electro-optic deflector 209 is an element capable of controlling the radiation position of the laser light 200A. With the electro-optic deflector 209, the exposure device 200 is also able to vary the radiation position of the laser light 200A guided onto the movable optical table 220 (what is called a Wobble mechanism). After the radiation position is adjusted by the electro-optic deflector 209, the laser light 200A is converted back into a collimated beam by the collimator lens 211. The laser light 200A exiting the deflecting optical system is reflected by the second mirror 213, and guided level with and parallel to the movable optical table 220.

The movable optical table 220 is provided with a beam expander (BEX) 221 and an objective lens 223. The laser light 200A guided to the movable optical table 220 is shaped into a desired beam shape by the beam expander 221, and then radiated via the objective lens 223 onto the base material resist layer formed on the master base material 110. In addition, the movable optical table 220 moves by one feed pitch (track pitch) in the direction of the arrow R (feed pitch direction) every time the master base material 110 undergoes one rotation. The master base material 110 is placed on the turntable 227. The spindle motor 225 causes the turntable 227 to rotate, thereby causing the master base material 110 to rotate. With this arrangement, the laser light 200A is made to scan over the base material resist layer. At this point, a latent image of the base material resist layer is formed along the scanning direction of the laser light 200A.

In addition, the control mechanism 230 is provided with a formatter 231 and a driver 233, and controls the radiation of the laser light 200A. The formatter 231 generates a modulation signal that controls the radiation of the laser light 200A, and the driver 233 controls the laser light source 201 on the basis of the modulation signal generated by the formatter 231. As a result, the irradiation of the master base material 110 by the laser light 200A is controlled.

Figure 5:
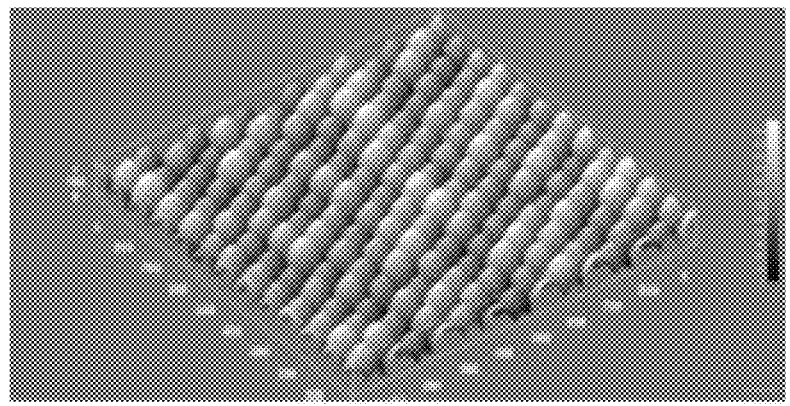
FIG. 5 is a perspective image showing an example of a layout of a convex microlens array.
Figure 6:
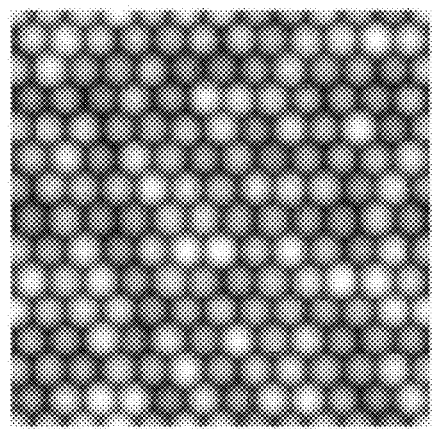
FIG. 6 is a plan image showing the example of the layout of the convex microlens array.

The formatter 231 generates a control signal for irradiating the base material resist layer with the laser light 200A, on the basis of an input image depicting an arbitrary pattern to draw on the base material resist layer. Specifically, first, the formatter 231 acquires an input image depicting an arbitrary draw pattern to draw on the base material resist layer. The input image is an image corresponding to a development of the outer circumferential surface of the base material resist layer, in which the outer circumferential surface of the base material resist layer is cut in the axial direction and expanded in a single plane. In this development, an image corresponding to the circumferential shape of the master 100 is depicted. This image shows the inverse shape of the surface shape of the optical body 1. An example of the input image is shown in FIG. 6. Further, a perspective image corresponding to FIG. 6 is shown in FIG. 5.

Next, the formatter 231 partitions the input image into sub-regions of a certain size (for example, partitions the input image into a lattice), and determines whether or not the concavity draw pattern (that is a pattern that corresponds to the concavity of the master 100) is included in each of the sub-regions. Subsequently, the formatter 231 generates a control signal to perform control to irradiate with the laser light 200A each sub-region determined to include the concavity draw pattern. The control signal (that is, the exposure signal) preferably is synchronized with the rotation of the spindle motor 225, but does not have to be synchronized. In addition, the control signal and the rotation of the spindle motor 225 may also be resynchronized every time the master base material 110 performs one rotation. Furthermore, the driver 233 controls the output of the laser light source 201 on the basis of the control signal generated by the formatter 231. As a result, the irradiation of the base material resist layer by the laser light 200A is controlled. Note that the exposure device 200 may also perform a known exposure control process, such as focus servo and positional correction of the irradiation spot of the laser light 200A. The focus servo may use the wavelength of the laser light 200A, or use another wavelength for reference.

In addition, the laser light 200A radiated from the laser light source 201 may irradiate the base material resist layer after being split into multiple optical subsystems. In this case, multiple irradiation spots are formed on the base material resist layer. In this case, when the laser light 200A emitted from one optical system reaches the latent image formed by another optical system, exposure may be ended.

Thus, according to the present embodiment, a latent image in accordance with a draw pattern of an input image can be formed on a resist layer. Then, the resist layer is developed, and the resist layer after development is used as a mask to etch the master base material 110 and the base material resist layer; thereby, a master concave-convex structure 120 in accordance with the draw pattern of the input image is formed on the master base material 110. That is, an arbitrary master concave-convex structure 120 in accordance with a draw pattern can be formed. Therefore, when a draw pattern in which the inverse shape of the optical body 1 is depicted is prepared as a draw pattern, a master concave-convex structure 120 having the inverse shape of the optical body 1 can be formed.

<7. With Regard to Method for Manufacturing Optical Body Using Master>

Figure 9:
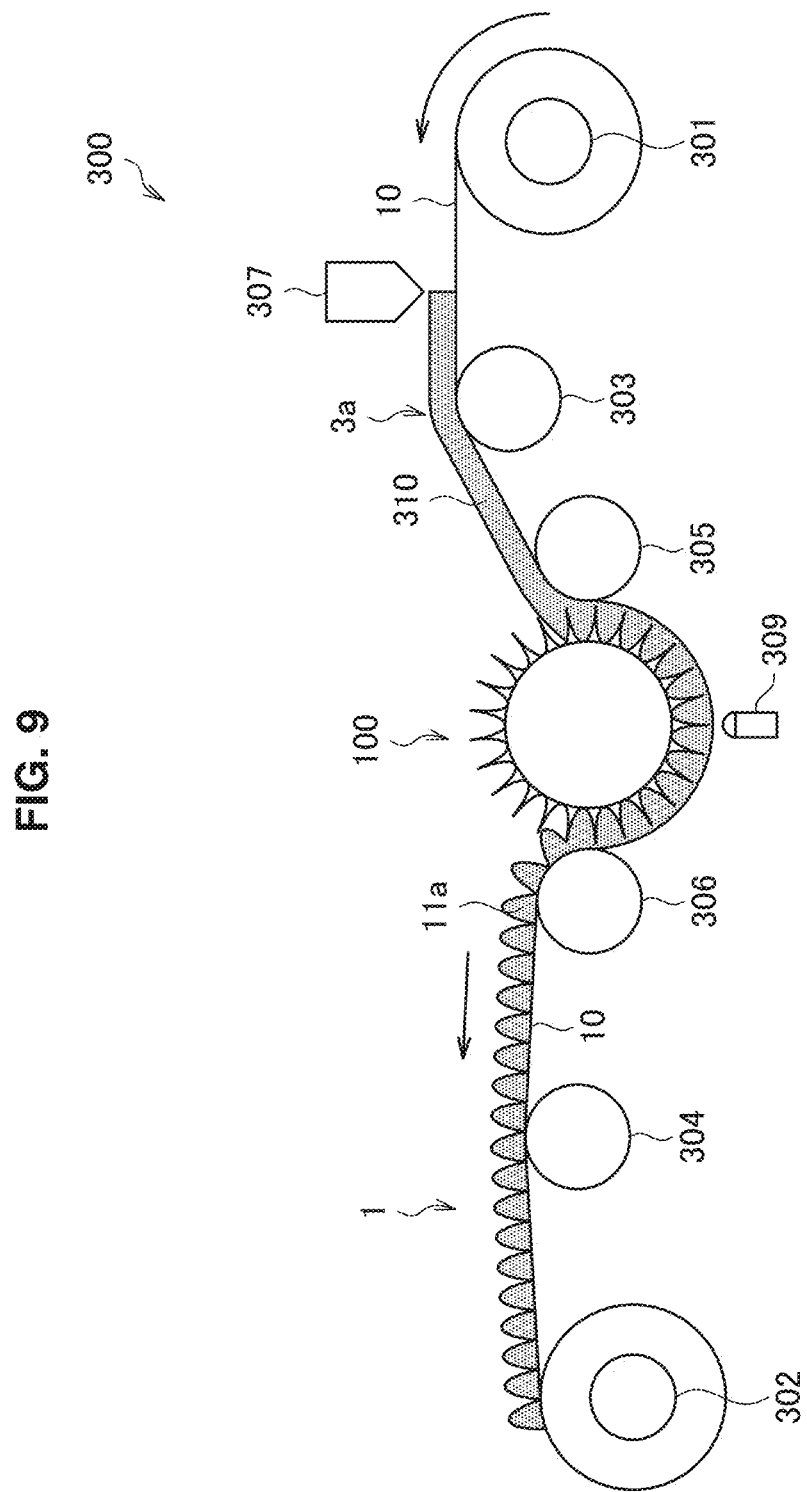
FIG. 9 is a schematic diagram illustrating an example of a transfer device that manufactures an optical body by roll-to-roll.

Next, an example of the method for manufacturing the optical body 1 using the master 100 is described with reference to FIG. 9. The optical body 1 can be manufactured by a transfer device 300 of a roll-to-roll system using the master 100. In the transfer device 300 shown in FIG. 9, the optical body 1 is produced using a light-curing resin.

The transfer device 300 is provided with the master 100, a base material supply roll 301, a take-up roll 302, guide rolls 303 and 304, a nip roll 305, a separation roll 306, an applicator device 307, and a light source 309.

The base material supply roll 301 is a roll around which a long-length base material 10 is wound in a roll, while the take-up roll 302 is a roll that take the optical body 1. Also, the guide rolls 303 and 304 are rolls that transport the base material 10. The nip roll 305 is a roll that puts the base material 10 laminated with an uncured resin layer 310, or in other words a transfer film 3a, in close contact with the master 100. The separation roll 306 is a roll that separates the optical body 1 from the master 100.

The applicator device 307 is provided with an applicating means such as a coater, and applies an uncured light-curing resin composition to the base material 10, and forms the uncured resin layer 310. The applicator device 307 may be a device such as a gravure coater, a wire bar coater, or a die coater, for example. Also, the light source 309 is a light source that emits light of a wavelength able to cure the light-curing resin composition, and may be a device such as an ultraviolet lamp, for example.

In the transfer device 300, first, the base material 10 is sent continuously from the base material supply roll 301 via the guide roll 303. Note that partway through the delivery, the base material supply roll 301 may also be changed to a base material supply roll 301 of a separate lot. The uncured light-curing resin composition is applied by the applicator device 307 to the delivered base material 10, and the uncured resin layer 310 is laminated onto the base material 10. As a result, the transfer film 3a is prepared. The transfer film 3a is put into close contact with the master 100 by the nip roll 305. The light source 309 irradiates with light the uncured resin layer 310 put in close contact with the master 100, thereby curing the uncured resin layer 310. With this arrangement, the arrangement pattern of the master concave-convex structure 120 formed on the outer circumferential face of the master 100 is transferred to the uncured resin layer 310. In other words, a concave-convex structure having the inverse shape of the master concave-convex structure 120 is formed on the base material 10. Next, the base material 10 in which the concave-convex structure is formed, that is the optical body 1, is separated from the master 100 by the separation roll 306. Next, the optical body 1 is taken up by the take-up roll 302 via the guide roll 304. Note that the master 100 may be oriented vertically or oriented horizontally, and a mechanism that corrects the angle and eccentricity of the master 100 during rotation may also be provided separately. For example, an eccentric tilt mechanism may be provided in a chucking mechanism.

Thus, in the transfer device 300, the transfer film 3a is transported by roll-to-roll, and on the other hand the circumferential shape of the master 100 is transferred to the transfer film 3a. Thereby, the optical body 1 is produced.

In the case where the optical body 1 is produced with a thermoplastic resin, the applicator device 307 and the light source 309 are not needed. In this case, a thermoplastic resin film is used as the base material 10, and a heating device is placed on the upstream side of the master 100. The base material 10 is heated and softened by the heating device, and then the base material 10 is pressed against the master 100. Thereby, the master concave-convex structure 120 formed on the circumferential surface of the master 100 is transferred to the base material 10. Also a film formed of a resin other than thermoplastic resins may be used as the base material 10, and the base material 10 and a thermoplastic resin film may be stacked. In this case, the stacked film is heated by a heating device, and is then pressed against the master 100. Thus, the transfer device 300 can continuously produce a transfer copy to which the master concave-convex structure 120 formed on the master 100 has been transferred, that is, the optical body 1.

In addition, a transfer film to which the master concave-convex structure 120 of the master 100 has been transferred may be produced, and the transfer film may be used as a transfer mold to produce the optical body 1. Also, the master 100 may be duplicated by electroforming, thermal transfer, or the like, and the duplicate may be used as a transfer mold. Furthermore, the shape of the master 100 is not necessarily limited to a roll shape, and may also be a planar master. Besides a method of irradiating resist with the laser light 200A, various processing methods can be selected, such as semiconductor exposure using a mask, electron beam lithography, machining, or anodic oxidation. Further, a resin film in which the light extraction unit 11 is formed by the manufacturing method described above may be stuck to both surfaces of the base material 10.

EXAMPLES

1. Base Conditions

Next, Examples (Test Examples) of the present embodiment are described. In the present Test Examples, simulations were performed to verify the effect of the present embodiment. First, the base conditions of the present simulations are described on the basis of FIG. 10.

Zemax OpticStudio manufactured by Zemax, LLC was used as a simulation software application. That is, an electronic computer was operated by the simulation software application to perform a simulation. An acrylic plate 0.8 mm long×0.7 mm wide×0.3 mm thick was used as the base material 10. On surface 10A of the base material 10, 17 convex microlenses 11a were arranged in a closest packing structure in which the distance between the apices of lenses (the pitch) was 60 to 100 μm (a regular arrangement of hexagonal closest packing with a rate of filling of 100%), as the light extraction unit 11 (a convex microlens array). Also the material of the convex microlens array was assumed to be an acrylic. Light sources 20 were arranged in positions 0.02 mm distant from the end surfaces of four sides of the base material 10 in the directions normal to the end surfaces, respectively. The size of the light source 20 was set to 0.6 mm long×0.02 mm wide, and the flat surface portion was made to face the respective end surface of the base material 10. The radiation angle of the light source 20 was set to 60 degrees as the full width at half maximum. The total light intensity of light emitted from each light source 20 was fixed between all the tests. Light receiving surfaces 400 each with a length of 1.2 mm × a width of 1.2 mm were arranged in positions 2.0 mm distant from surface 10A (the front surface side) and surface 10B (the back surface side) of the base material 10 in the directions normal to these surfaces, respectively. The light receiving surface was made to face the respective surface of the base material 10. Then, the total light intensity on each light receiving surface 400 was measured as an index of light extraction efficiency.

Figure 11:
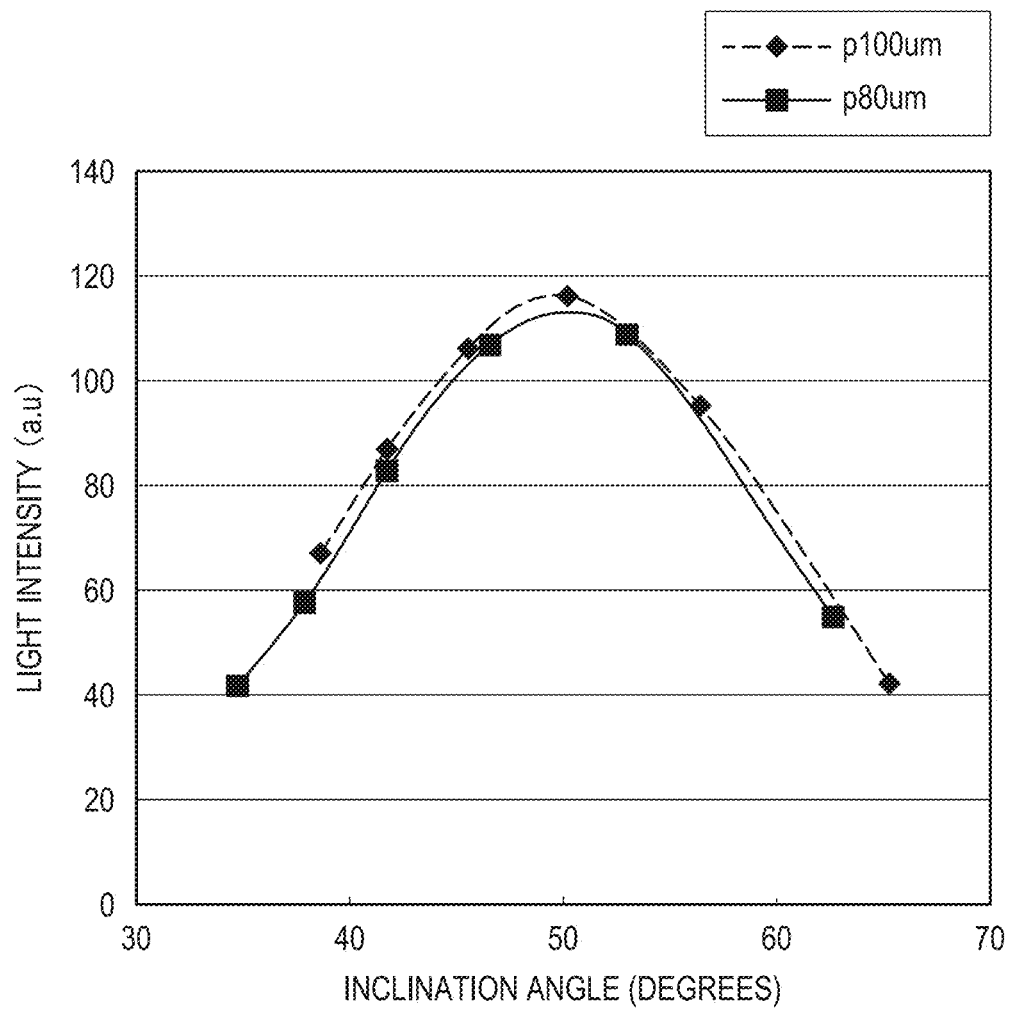
FIG. 11 is a graph showing corresponding relationships between a maximum inclination angle of a convex microlens array and a light intensity.

2. Test Example 1: Corresponding Relationship Between Maximum Inclination Angle and Maximum Propagation Angle In Test Example 1, the corresponding relationship between the maximum inclination angle $\theta_{Ln}$ of the convex microlens array and the maximum propagation angle $\theta_0$ was investigated. Specifically, the pitch was fixed to either of 80 μm and 100 μm; and the radius of curvature of the convex microlens 11a was changed, and thereby the maximum inclination angle $\theta_{Ln}$ of the convex microlens array was changed. The arithmetic average value of the maximum inclination angles $\theta_L$ of the 17 convex microlenses 11a was used as the maximum inclination angle $\theta_{Ln}$ of the convex microlens array. Then, the corresponding relationship between the maximum inclination angle $\theta_{Ln}$ of the convex microlens array and the maximum propagation angle $\theta_0$ was found. The results are shown in FIG. 11. The horizontal axis of FIG. 11 represents the maximum inclination angle $\theta_{Ln}$ of the convex microlens array, and the vertical axis represents the total light intensity on the back surface side. Since the material of the convex microlens array is an acrylic, n=1.49, and the maximum propagation angle $\theta_0$ is approximately 48 degrees by Mathematical Formula (2).

From FIG. 11, it has been found that, regardless of the magnitude of the pitch, the total light intensity was at the maximum when the maximum inclination angle $\theta_{Ln}$ of the convex microlens array was 50 degrees, that is, substantially coincided with the maximum propagation angle $\theta_0$. That is, the light extraction efficiency was at the maximum. Further, from FIG. 11, it has been found that the total light intensity is largest in the case where the maximum inclination angle $\theta_{Ln}$ of the convex microlens array has an error with the maximum propagation angle $\theta_0$ of less than or equal to ±3 degrees, and the total light intensity decreases as the error between these transitions from less than or equal to ±5 degrees, to less than or equal to ±7 degrees, and to less than or equal to ±10 degrees. Thus, the effect of the present embodiment has been verified. On the other hand, in JP 2004-145328A, the maximum inclination angle $\theta_{Ln}$ of the convex microlens array is approximately 70 degrees. Thus, the light extraction efficiency is small.

Figure 10:
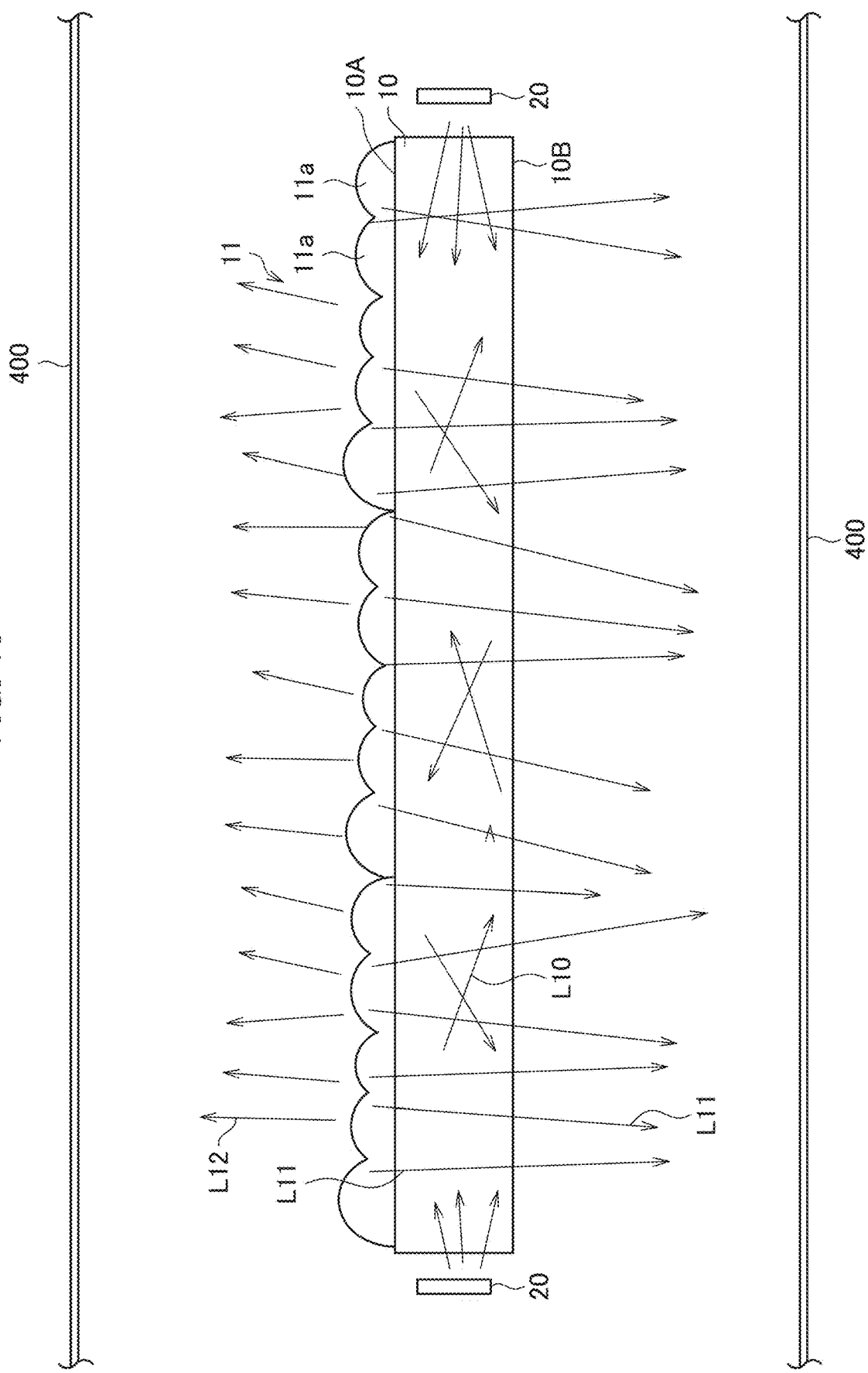
FIG. 10 is a side cross-sectional view conceptually showing a manner of a simulation performed in Examples.
Figure 12:
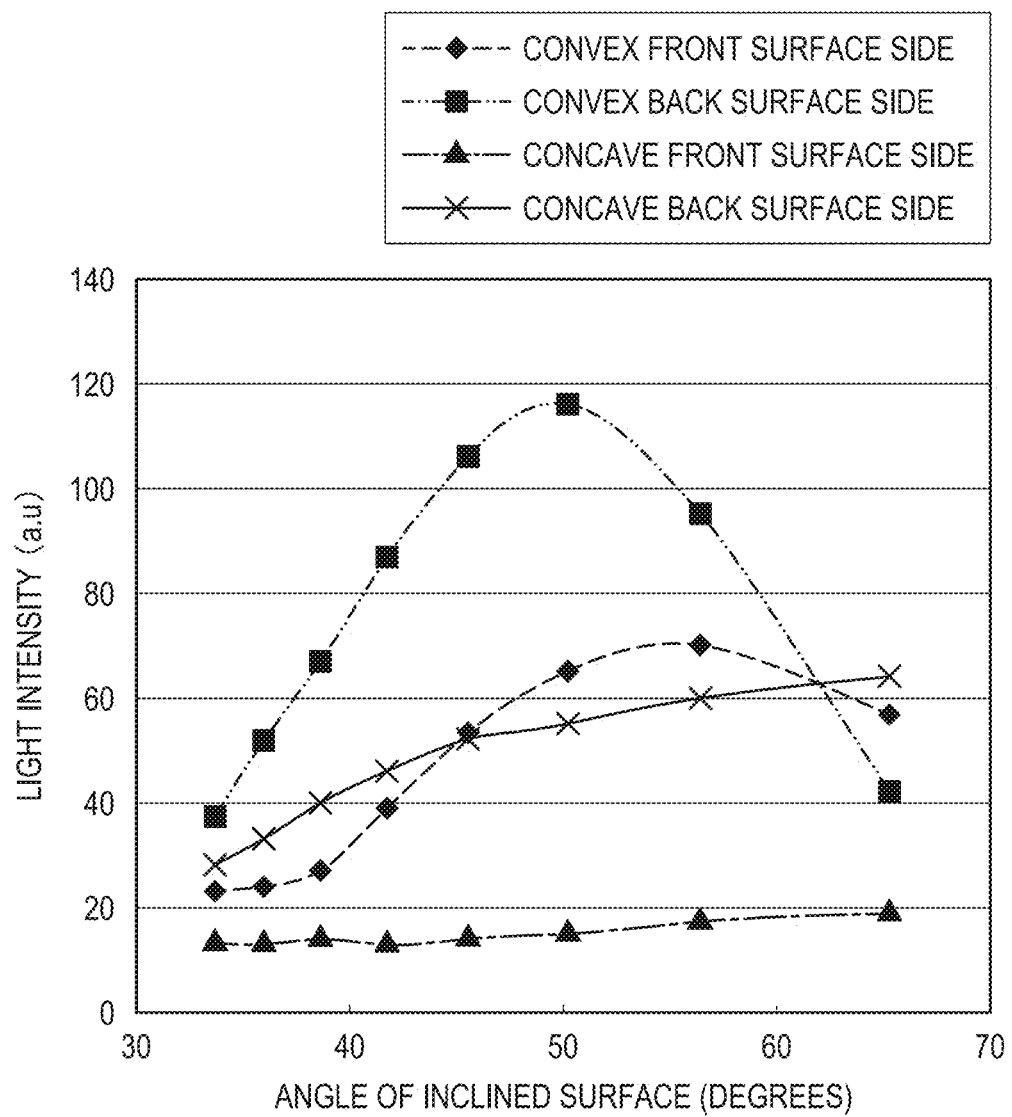
FIG. 12 is a graph showing corresponding relationships between a maximum inclination angle of a convex or concave microlens array and a light intensity.

3. Test Example 2: Corresponding Relationship Between Polarity (Concavity or Convexity) of Microlens and Total Light Intensity Next, the corresponding relationship between the polarity (concavity or convexity) of the microlens and the total light intensity was investigated. Specifically, the convex microlens 11a of a base condition was changed to a concave microlens, and processing similar to Test Example 1 was performed. The pitch was set to 100 μm. For comparison, processing similar to Test Example 1 was performed. In Test Example 2, the total light intensity not only on the back surface side but also on the front surface side was measured. Straight line L12 of FIG. 10 shows the optical path of light emitted on the front surface side. The results are shown in FIG. 12. The definitions of the vertical axis and the horizontal axis of FIG. 12 are similar to those of FIG. 11. In the case where convex microlenses 11a were used and the total light intensity on the back surface side was measured, similar results to Test Example 1 were obtained. On the other hand, in the case where convex microlenses 11a were used and the total light intensity on the front surface side was measured, results like those in Test Example 1 were not obtained. That is, the total light intensity was low, and the maximum inclination angle $\theta_{Ln}$ at which the total light intensity was at the maximum was a value different from 48 degrees. However, in the case where the optical body 1 is used as a light guide plate, display on the back surface side is used, and it can be said that these results are desirable.

On the other hand, in the case where concave microlenses were used, the total light intensity was low both on the front surface side and on the back surface side. Thus, the effect of the present embodiment was not found in the concave microlenses. Table 1 shows the results of Test Example 2.

TABLE 1

|  | Reference Example | Example | Comparative Example 1 | Comparative Example 2 |
|---|---|---|---|---|
| Polarity of microlens | Convex | Convex | Concave | Concave |
| Measured surface | Front surface side | Back surface side | Front surface side | Back surface side |
| Maximum light intensity | 70 | 115 | 20 | 64 |
| Maximum inclination angle $\theta_{Ln}$ at which maximum light intensity was obtained | 58 degrees | 50 degrees | 67 degrees | 67 degrees |

4. Test Example 3: Corresponding Relationship Between Rate of Filling of Convex Microlens Array and Optical Characteristics Next, the corresponding relationship between the rate of filling of the convex microlens array and optical characteristics was investigated. Specifically, the rate of filling was set to 100% or 70%, and processing similar to Test Example 1 was performed. The pitch was fixed to 100 μm. As a result, it has been found that the maximum value of the total light intensity (the maximum light intensity) at the time of the rate of filling of 100% was larger (approximately 1.3 times) than the maximum light intensity at the time of the rate of filling of 70%. That is, the light extraction efficiency at the time of the rate of filling of 100% was larger than the light extraction efficiency at the time of the rate of filling of 70%. However, the maximum light intensity at the time of the rate of filling of 70% was larger than those in Comparative Examples 1 and 2. Further, an image that is to be displayed on a light receiving surface on the back surface side by the light extraction unit 11 was caused to be displayed on a display of the electronic computer. Then, the feeling of granularity of the image was visually observed; thus, it has been found that the image at the rate of filling of 100% had almost no feeling of granularity, but the image at the rate of filling of 70% had a little feeling of granularity.

It should be understood by those skilled in the art that various modifications, combinations, sub-combinations and alterations may occur depending on design requirements and other factors insofar as they are within the scope of the appended claims or the equivalents thereof.

What is claimed is:

1. An optical body comprising:
   a base material; and
   a light extraction unit that is formed on an external surface of the base material and that extracts, to an opposite surface of the base material, internally propagating light that is injected in an inside of the base material from a side surface of the base material,
   wherein the light extraction unit is formed of a convex microlens array, wherein the convex microlens array is convex with respect to an exterior surface of the microlens array, and
   an arithmetic average value of maximum inclination angles of microlenses in the convex microlens array substantially coincides with a maximum propagation angle of the internally propagating light.

2. The optical body according to claim 1,
   wherein a ratio of the area of convex microlenses in a total area of the convex microlens array is 100%.

3. The optical body according to claim 1,
   wherein a boundary line between convex microlenses constituting the convex microlens array forms a straight line that is part of a polygon formed from multiple boundary lines in a planar view.

4. A light emitting device comprising:
   the optical body according to claim 1; and
   a light source that is provided on a side surface of the optical body and injects light into an inside of the optical body from the side surface of the optical body.

* * * * *